United States Patent
Jonasson et al.

(10) Patent No.: US 7,868,501 B2
(45) Date of Patent: Jan. 11, 2011

(54) ROTOR FOR AN ELECTRIC MOTOR, ROTOR DISCS FOR CONSTRUCTION OF THE ROTOR, AND AN ELECTRIC MOTOR HAVING SUCH A ROTOR

(75) Inventors: Pontus Jonasson, Örnsköldsvik (SE); Jens Wågberg, Uppsala (SE)

(73) Assignee: BAE Systems Hägglunds Aktiebolag (SE)

( * ) Notice: Subject to any disclaimer, the term of this patent is extended or adjusted under 35 U.S.C. 154(b) by 340 days.

(21) Appl. No.: 12/002,790

(22) Filed: Dec. 18, 2007

(65) Prior Publication Data

US 2008/0164780 A1    Jul. 10, 2008

(30) Foreign Application Priority Data

Dec. 19, 2006    (SE)    .................................. 0602750

(51) Int. Cl.
  *H02K 1/17*    (2006.01)
(52) U.S. Cl. ............................. 310/156.53; 310/156.56
(58) Field of Classification Search ............ 310/156.08, 310/153.53–156.57; *H02K 1/14, 1/17, 21/12*
  See application file for complete search history.

(56) References Cited

U.S. PATENT DOCUMENTS

| 3,840,763 | A | * | 10/1974 | Baumann et al. | ........ | 310/156.56 |
| 4,682,067 | A | | 7/1987 | Oudet | | |
| 5,319,270 | A | | 6/1994 | Tanaka et al. | | |
| 5,378,953 | A | * | 1/1995 | Uchida et al. | ........ | 310/156.59 |
| 5,684,352 | A | * | 11/1997 | Mita et al. | ........ | 310/156.56 |
| 6,441,524 | B2 | * | 8/2002 | Kaneko et al. | ........ | 310/156.45 |
| 6,525,442 | B2 | * | 2/2003 | Koharagi et al. | ....... | 310/156.48 |
| 6,897,595 | B1 | | 5/2005 | Chiarenza | | |
| 6,917,133 | B2 | * | 7/2005 | Koharagi et al. | ....... | 310/156.57 |
| 7,321,177 | B2 | * | 1/2008 | Uchida et al. | .......... | 310/216.019 |
| 2003/0201685 | A1 | * | 10/2003 | Shimada et al. | ........ | 310/156.53 |
| 2005/0001503 | A1 | * | 1/2005 | Hans | ..................... | 310/156.53 |

FOREIGN PATENT DOCUMENTS

| DE | 20201831 | U1 | 4/2002 | | |
| EP | 0056521 | A2 | 7/1982 | | |
| GB | 1177247 | | * | 1/1970 | ............ 310/156.53 |
| JP | 2000-116042 | A | | 4/2000 | |
| WO | WO-00/62399 | A2 | | 10/2000 | |

OTHER PUBLICATIONS

"Singapore Application Serial No. 200718408-8, Search and Examination Report mailed Jul. 09, 2009", 9 pgs.

* cited by examiner

*Primary Examiner*—Tran N Nguyen
(74) *Attorney, Agent, or Firm*—Schwegman, Lundberg & Woessner, P.A.

(57) ABSTRACT

Annular rotor disc for, in an axially stacked disc assembly of a plurality of similar rotor discs, forming a rotor for an electric motor, in which the discs secure a plurality of axially running permanent bar magnets, of substantially rectangular cross-sectional shape, distributed around the circumference of the rotor. The rotor disc has pockets for accommodating and securing the permanent bar magnets in such a way that adjoining bars form an angle to one another. The pockets for adjacent, mutually diverging permanent bar magnets, viewed in the radial direction from the centre of the rotor, delimit between them a substantially triangular disc part, which is flexibly connected to a radially inner part of the annular rotor disc only by a radically inner web portion.

6 Claims, 2 Drawing Sheets

ROTOR FOR AN ELECTRIC MOTOR, ROTOR DISCS FOR CONSTRUCTION OF THE ROTOR, AND AN ELECTRIC MOTOR HAVING SUCH A ROTOR

BACKGROUND OF THE INVENTION

1. Technical Field

The present invention relates to a rotor for an electric motor, which comprises a plurality of annular rotor discs, stacked into an axial disc assembly, for securing a plurality of permanent bar magnets, of substantially rectangular cross-sectional shape, distributed around the circumference of the rotor, wherein the rotor discs have pockets of substantially corresponding cross-sectional shape for accommodating and securing the permanent bar magnets in such a way that adjoining bars form an angle to one another and to a radius of the rotor, and that at least a portion of one end edge of each bar is exposed to the outer periphery of the disc assembly.

The invention also relates to an annular rotor disc for, in an axially stacked disc assembly of a plurality of similar rotor discs, forming a rotor for an electric motor, and to an electric motor having such a rotor.

2. Related Art

In rotors for certain types of electric motors (PM motors), annular, so-called rotor discs are used, which are stacked axially to overlap one another and which are configured to support axially running permanent magnets distributed around the circumference. Usually, these permanent magnets are surface-mounted on the periphery of the rotor by gluing or they are mounted buried in closed pockets in the disc elements of the rotor. The pockets in the discs can also be made open towards the outer periphery of the rotor in order that the permanent magnets shall be exposed to the stator with a small air gap between the stator and the rotor, which gives a reduced magnetic leakage and increased magnetic flux.

Through JP 2000-116042 A, a PM motor is previously known, the rotor of which is constructed of a large number of axially overlapping rotor discs having tangential and, at one end at least, open slots for the insertion and securement of permanent magnets, the open slots opening out towards the periphery of the rotor in order to increase the magnetic flux and reduce magnetic leakage. For secure fixing of the permanent magnets in the rotor, two different discs and possibly gluing are required.

WO 00/62399 shows a rotor for an electric motor, in which various types of rotor discs are required to secure permanent magnets placed in a V-shape in such a way that one end of the magnets is held exposed towards the outer periphery of the rotor, which adds to the difficulty and cost of assembly.

DE 202 01 831 U1 describes a rotor disc for PM motors, in which tangentially orientated magnets are held clamped on the periphery with the aid of resilient plates, which, without glue, allow secure surface-mounting of the magnets with a single type of rotor disc, the magnets being able to be situated close to a small air gap between rotor and stator. However, there is a relatively large air gap to the rotor disc radially within the magnets and a small contact surface therebetween, which adversely affects the magnetic flux in the rotor itself. The tangential placement of the magnets also means that the number of magnets is severely limited, as is the total magnetic flux.

SUMMARY OF INVENTION

One object of the present invention is to propose a rotor for an electric motor of the kind stated in the introduction, which allows the use of a single type of rotor discs in order to fix the magnets in the rotor discs in a simple manner by clamping, without the aid of glue, whilst simultaneously exposing an edge portion of the magnetic bars so as to reduce magnetic leakage and facilitate the magnetic flux between rotor and stator, the glue-free fixing of the permanent magnets in the rotor discs of the rotor also allowing a simple disassembly of the permanent magnets for subsequent reuse.

Various embodiments include a rotor for an electric motor, comprising a plurality of annular rotor discs, stacked into an axial disc assembly, for securing a plurality of axially running permanent bar magnets, of substantially rectangular cross-sectional shape, distributed around the circumference of the rotor, wherein the rotor discs have pockets of substantially corresponding cross-sectional shape for accommodating and securing the permanent bar magnets in such a way that adjoining bars form an angle to one another and to a radius of the rotor, and that at least a portion of one end edge of each bar is exposed to the outer periphery of the disc assembly, wherein the pockets for adjacent, mutually diverging permanent bar magnets, viewed in the radial direction from the centre of the rotor, in each rotor disc delimit between them a substantially triangular disc part, which is flexibly connected to a radially inner part of the annular rotor disc only by a radially inner web portion.

Another object of the invention is to produce an annular rotor disc for a rotor for an electric motor.

Various embodiments include an annular rotor disc for, in an axially stacked disc assembly of a plurality of similar rotor discs, forming a rotor for an electric motor, in which the discs secure a plurality of axially running permanent bar magnets, of substantially rectangular cross-sectional shape, distributed around the circumference of the rotor, wherein the rotor disc has pockets of substantially corresponding cross-sectional shape for accommodating and securing the permanent bar magnets in such a way that adjoining bars form an angle to one another and to a radius of the rotor, and that at least a portion of one end edge of each bar magnet is exposed to the outer periphery of the disc assembly, wherein the pockets for adjacent, mutually diverging permanent bar magnets, viewed in the radial direction from the centre of the rotor, in each rotor disc delimit between them a substantially triangular disc part, which is flexibly connected to a radially inner part of the annular rotor disc only by a radially inner web portion.

Finally, various embodiments include an electric motor comprising a rotor constructed of the annular discs according to various embodiments of the invention.

Various embodiments include an electric motor having a rotor, constructed of a plurality of axially stacked, annular rotor discs, for securing a plurality of axially running permanent bar magnets, of substantially rectangular cross-sectional shape, distributed around the circumference of the rotor, and a stator surrounding the rotor and having windings which are placed around teeth and are configured, when current is fed to the windings, to form electromagnets for acting upon the permanent magnets so as to generate a torque on an output shaft connected to the rotor, wherein the rotor discs have pockets of substantially corresponding cross-sectional shape for accommodating and securing the permanent bar magnets in such a way that adjoining bars form an angle to one another and to a radius of the rotor, and that at least a portion of one end edge of each bar is exposed to the outer periphery of the disc assembly, wherein the pockets for adjacent, mutually diverging permanent bar magnets, viewed in the radial direction from the centre of the rotor, in each rotor disc delimit between them a substantially triangular disc part, which is flexibly connected to a radially inner part of the annular rotor disc only by a radially inner web portion.

Further features of the subjects of the application according to the invention emerge from the dependent patent claims and are described in greater detail below with reference to the appended drawings.

MODE(S) FOR CARRYING OUT THE INVENTION

Figure 1:
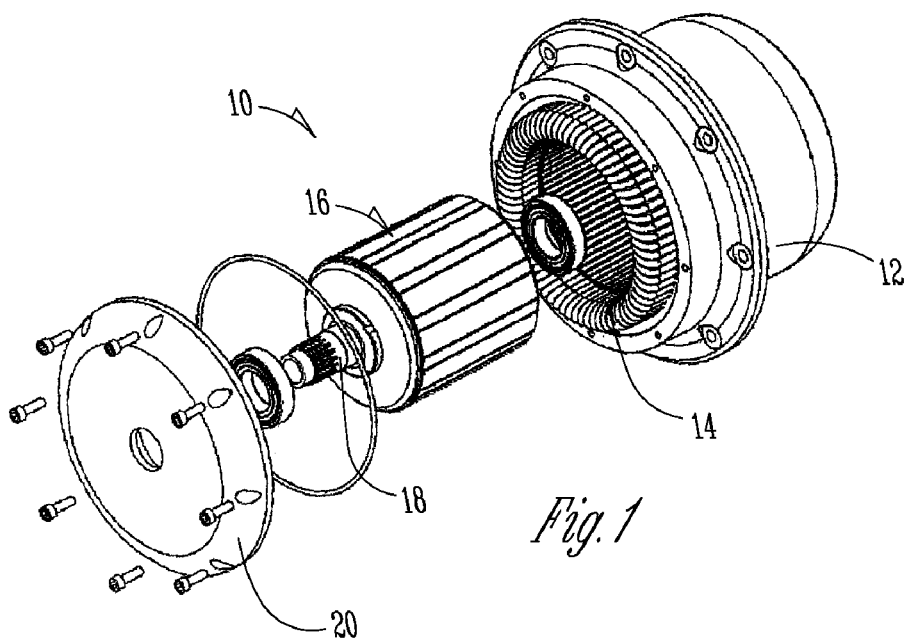
FIG. 1 shows diagrammatically an exploded view in perspective of a PM motor.

An electric motor of the PM type to which the present invention relates is shown in FIG. 1 and is denoted in general terms by 10. The electric motor 10 comprises a housing 12, in which windings 14 of copper wire are placed around teeth (not shown) for the formation of an annular stator. A rotor 16 is rotatably mounted inside the stator and is connected in a rotationally secure manner to an output shaft 18. A cover lid which is anchored to the housing 12 is denoted by 20.

Figure 2:
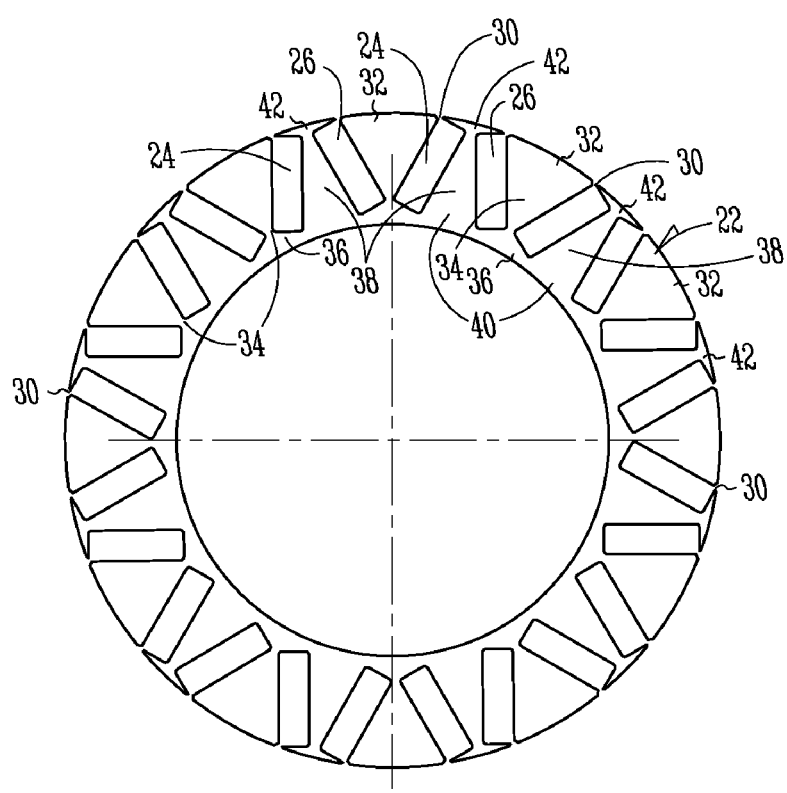
FIG. 2 is a side view of a rotor disc according to the invention.
Figure 3:
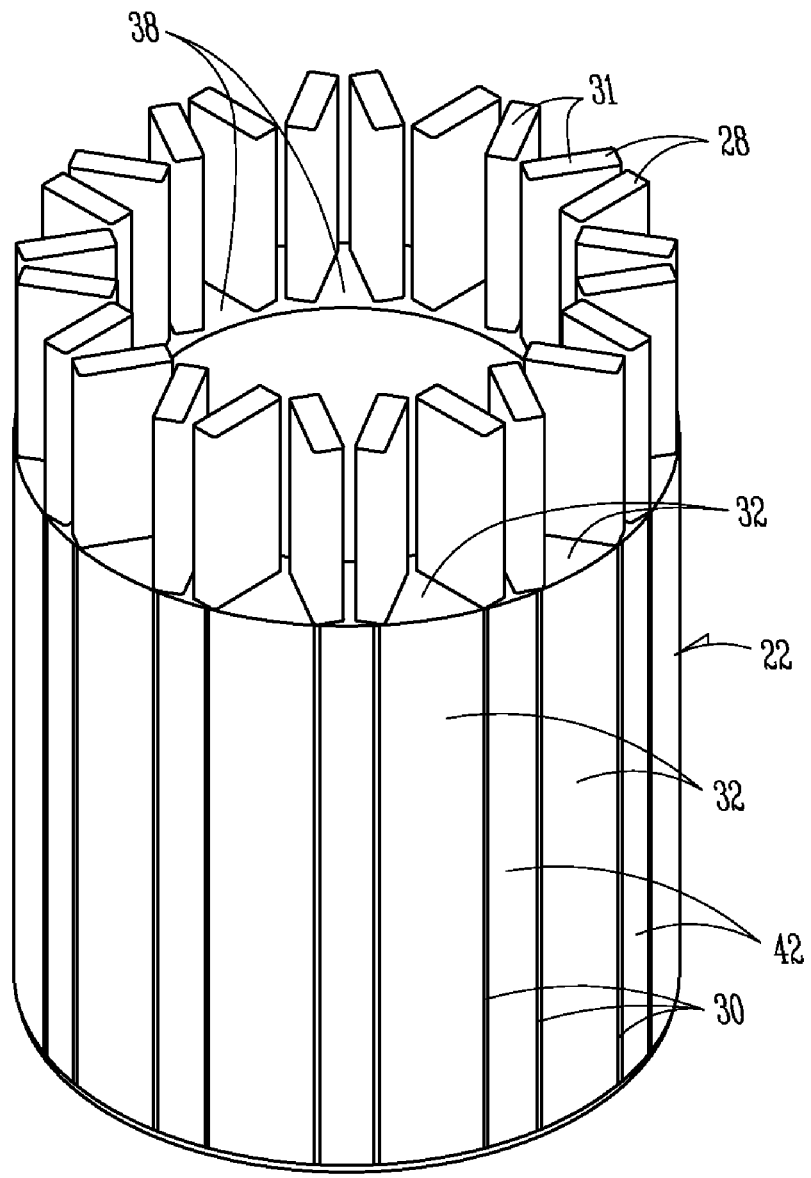
FIG. 3 is a perspective view of an assembly phase of the rotor discs.

The rotor 16 is constructed of a plurality of, normally several hundred, annular rotor discs 22 of material suitable for the purpose (FIGS. 2 and 3), which are stacked in mutually overlapping arrangement to form an axial disc assembly. Each rotor disc 22 has a plurality of pockets 24, 26, of preferably rectangular cross-sectional shape, for the reception of axially elongated permanent magnets 28 of corresponding cross section. The pockets 24, 26 are orientated at an angle relative to each other and have on their one outer edge an opening 30 which is narrow in relation to the width of the pocket. In an arrangement for 24 permanent bar magnets, as shown in FIGS. 2 and 3, the angle between the pockets 24, 26 can measure about 63° and the opening 30 can have a width of about a few millimeters. FIG. 3 shows how, in the assembly operation, the rotor discs 22 are first stacked into a disc assembly with the aid of steel bars 31, before these are removed and replaced by the magnetic bars 28.

Between the mutually diverging pockets 24, 26, viewed in the radial direction from the centre of the rotor disc 22, a substantially triangular or sector-shaped disc part 32 is delimited, which at a radially inner corner is connected to a radially inner part 36 of the annular rotor disc 22 only via a thin web portion 34. This thin web portion 34, which can have a width of about 1 mm, allows a flexibility in the circumferential direction for the sector-shaped part 32. Between adjacent pockets 24, 26, which, viewed in the radial direction from the centre of the rotor disc 22, are mutually converging, a substantially triangular disc part 38 is delimited, which is fixedly connected to the radially inner part 36 of the annular rotor disc 22 by a radially inner base part 40 and which, at a radially outer tip portion, has a substantially tangential peripheral part 42, which is configured to secure that end of the permanent bar magnets 28 inserted in the pockets 24, 26 which is exposed in the opening 30.

The fact that the sector-shaped disc parts 32 are flexibly secured in the inner part 36 of the rotor disc 22 at the thin web portion 34 means that they can act as a clamping joint between the adjacent magnets 28, when these are axially inserted in the pockets 24, 26, and at the same time can balance out dimensional variations of the magnets. Together with the peripheral part 42, the magnets 28 are firmly secured in the pockets 24, 26 during the rotation of the rotor 16 without the need for any further adhesives, such as glue or the like.

By virtue of its design with an open outer corner in the magnet pockets 24, 26, the rotor disc 22 proposed according to the invention allows the magnetic flux between rotor and stator to be maximized in conjunction with minimal flux leakage, which helps to increase the power of the electric motor. In addition, the magnets 28 are easy to recover when the motor is scrapped, since they are not glued in place in the rotor discs 22.

What is claimed is:

1. A rotor for an electric motor comprising:
   a plurality of annular rotor discs stacked into an axial disc assembly; and
   a plurality of axially elongated permanent magnets having substantially a rectangular cross-sectional shape and distributed around a circumference of the rotor;
   wherein the plurality of annular rotor discs are for securing the plurality of axially elongated permanent magnets,
   wherein each of the annular rotor discs includes a plurality of pockets, each of the pockets having a substantially corresponding rectangular cross-sectional shape for accommodating and securing the axially elongated permanent magnets in such a way that adjacent axially elongated permanent magnets installed in adjacent ones of the plurality of pockets form an angle to one another and to a radius of the rotor, and that at least a portion of one end edge of each axially elongated permanent magnet is exposed to an outer periphery of the axial disc assembly, and
   wherein the plurality of pockets for adjacent and mutually diverging axially elongated permanent magnets, as viewed in a radial direction from a centre of the rotor in each annular rotor disc delimit a substantially triangular disc part, the substantially triangular disc part flexibly connected to a radially inner part of the annular rotor disc only by a radially inner web portion and forming a flexible clamping joint between the adjacent ones of the plurality of pockets, the flexible clamping joint operable to secure the axially elongated permanent magnets installed in the adjacent ones of the plurality of pockets.

2. The rotor according to claim 1, wherein at least one of the pockets further includes a radially outer tip portion having a substantially tangential peripheral part which secures the end edge that is exposed of the axially elongated permanent magnet in the at least one pocket.

3. A rotor disc comprising:
   an annular rotor disc for assembly in an axially stacked disc assembly of a plurality of similar rotor discs for forming a rotor for an electric motor, the annular rotor disc including a plurality of pockets operable to secure a plurality of axially elongated permanent magnets having substantially a rectangular cross-sectional shape and such that when secured in the annular rotor disc assembly the axially elongated permanent magnets are distributed around a circumference of the rotor of the electric motor;
   wherein the annular rotor disc pockets include a substantially corresponding cross-sectional shape for accommodating and securing the axially elongated permanent magnets in such a way that adjacent axially elongated permanent magnets installed in adjacent ones of the plurality of pockets form an angle to one another and to a radius of the rotor, and wherein each of the pockets includes an opening so that when an axially elongated permanent magnet is secured in the pocket at least a portion of one end edge of the axially elongated permanent magnet installed in the pocket is exposed at an opening at an outer periphery of the annular rotor disc, and wherein the pockets that are adjacent and mutually diverging, as viewed in a radial direction from a centre of the annular rotor disc as it would be installed on the rotor, delimit a substantially triangular disc part the substantially triangular disc part flexibly connected to a radially inner part of the annular rotor disc only by a radially inner web portion and forming a flexible clamping joint between the adjacent ones of the plurality of pockets, the flexible clamping joint operable to secure the axially elongated permanent magnets after the axially elongated permanent magnets are installed in the adjacent ones of the plurality of pockets.

4. The rotor disc according to claim 3, wherein at least one of the pockets further includes a radially outer tip portion having a substantially tangential peripheral part operable to secure an axially elongated permanent magnet having one end edge of the secured axially elongated permanent magnet partially exposed when the axially elongated permanent magnet is secured in the pocket.

5. An electric motor comprising:

a rotor;

a plurality of axially elongated permanent magnets having substantially a rectangular cross-sectional shape and distributed around a circumference of the rotor;

wherein the rotor includes a plurality of axially stacked annular rotor discs for securing the plurality of axially elongated permanent magnets; and a stator surrounding the rotor and having windings which are placed around teeth and are configured so that when current is fed to the windings the windings form electromagnets for acting upon the axially elongated permanent magnets so as to generate a torque on an output shaft connected to the rotor, wherein the annular rotor discs include a plurality of pockets, each of the pockets having a substantially corresponding cross-sectional shape for accommodating and securing the axially elongated permanent magnets in such a way that adjacent axially elongated permanent magnets installed in adjacent ones of the plurality of pockets form an angle to one another and to a radius of the rotor, and that at least a portion of one end edge of each axially elongated permanent magnet is exposed to an outer periphery of the rotor, wherein the pockets for adjacent and mutually diverging axially elongated permanent magnets, as viewed in a radial direction from a centre of the rotor in each rotor disc delimit a substantially triangular disc part, the substantially triangular disc part flexibly connected to a radially inner part of the annular rotor disc only by a radially inner web portion and forming a flexible clamping joint between the adjacent ones of the plurality of pockets, the flexible clamping joint operable to secure the axially elongated permanent magnets installed in the adjacent ones of the plurality of pockets.

6. Electric motor according to claim 5, wherein at least one of the pockets further includes a radially outer tip portion having a substantially tangential peripheral part which secures the end edge that is exposed of the axially elongated permanent magnet in the at least one pocket.

* * * * *